Patented July 22, 1941

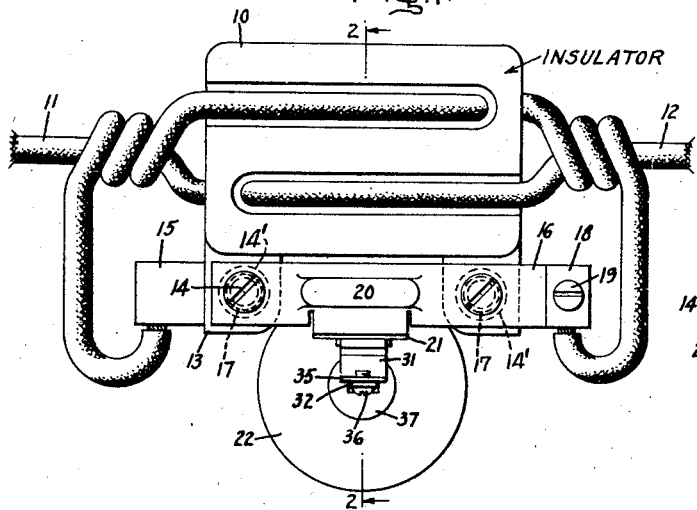

2,250,210

UNITED STATES PATENT OFFICE 2,250,210

ELECTRIC CIRCUIT INTERRUPTER

Sidney R. Smith, Jr., Pittsfield, Mass., assignor to General Electric Company, a corporation of New York Application July 19, 1939, Serial No. 285,339

12 Claims. (Cl. 200—117)

The present invention relates to electric circuit interrupting devices, and has for an object the provision of an improved, simplified, and low cost design for circuit interrupters which are suitable for mounting on overhead electric lines and like installations and which are operative to give an indication, clearly observable from a distance, when a circuit is interrupted thereby.

One of the more specific objects of the invention is the provision of an improved form of indicating circuit interrupter suitable for suspension mounting directly on a line conductor or conductors of an overhead electric line. To this end I propose, as one aspect of the present invention, the employment of a modified form of a common type of line suspension strain insulator as a supporting base for a quickly and easily mountable circuit interrupting unit.

A further object of the invention is the provision of an improved form of line suspension indicating "secondary" fuse cutout.

The invention has also, as one of its more specific objects, the provision of a circuit interrupting unit with an improved mounting arrangement which is effective normally to impose tension on a conductor of the said unit while supporting the unit in an operative position, and which mounting arrangement is effective to cause movement of an element or elements of the said unit to indicating position in response to circuit interrupting operation.

Other objects and the details of that which I consider to be novel and my present invention will become apparent from the following description and the claims appended thereto, taken in conjunction with the accompanying drawing wherein are shown three exemplary embodiments of the invention. In the drawing, Fig. 1 is a side elevation of the first of these embodiments, while Fig. 2 is a sectional elevation along the line 2—2 of Fig. 1, showing the parts in normal positions, and Fig. 3 is a sectional elevation, similar to that of Fig. 2, showing the parts in operated positions; Fig. 4 is a partial sectional elevation of a second embodiment; Fig. 5 is a partial sectional elevation of a third embodiment, and Figs. 6 and 7 show details of construction of a part of the device of Fig. 5.

Referring particularly to Figs. 1, 2, and 3, 10 designates an insulator, which is a modification of a common type of line suspension strain insulator and which serves mechanically to join, while electrically insulating from each other, two line conductors 11 and 12. The line conductors are joined to the insulator in a well known manner which needs no detailed description here. On the bottom of the insulator and respectively adjacent the opposite ends thereof are two depending projections 13. Each of these projections has, respectively on opposite sides thereof, two screws 14 which extend through spacing washers 14' and serve loosely to support metallic contact bars 15 and 16. These contact bars are located respectively on opposite sides of projections 13, as will be seen best from Fig. 2, and are biased relatively toward each other by means of springs 17 which are supported on screws 14. The bared free end of conductor 12 is secured to one end of contact bar 16 by means of a clamping plate 18 and screw 19, and the bared free end of conductor 11 is secured to the opposite end of contact bar 15 in a similar manner. Each of the contact bars has a longitudinally extending groove 20 to serve as a bearing seat as described hereinafter, and has also outwardly flaring guide portions 21.

The circuit interrupting unit of Fig. 1 includes an insulating carrier or holder 22 comprised in the main of an annular spacer 23 and disk-like plates 24 suitably secured on opposite sides of spacer 23, as shown in Fig. 2. This construction provides an explosion chamber 25 having gas discharge ports in the form of relatively small centrally located openings 26 in plates 24. A supporting element or hinge bracket 27 is secured adjacent the top of each of the end plates 24 and is provided with openings which accommodate trunnions 30 of a metallic lever-like element 31. The two lever-like elements 31 are swingable relative to each other and to the body of carrier 22, but normally are restrained in close parallel extending relation to the outer surfaces of end plates 24 by means of a strain member associated with a fusible conductor connected therebetween. In the embodiment of Figs. 1–3, and also in the embodiment of Fig. 4, there is employed a conductor having terminal end portions 32 and a middle portion, or fusible section, comprised of a fuse wire 33 and a strain wire 34. The end portions 32 of the conductor are fastened to attachment sections 35 on the lower free ends of hinged elements 31 by means of screws 36. It will be understood of course that other suitable forms of conductor and other methods of attachment of the conductor to the hinged elements 31 may be employed if desired.

Each of the levers 31 carries, adjacent its lower free end, a closure plate 37 which has a small centrally located opening for passage of one of the conductor terminal sections 32 therethrough.

These plates 37 serve, when lever elements 31 are in their normal positions shown in Fig. 2, to substantially close openings 26 in end plates 24 of carrier 22. Thus there is provided a substantially weather-tight enclosure which materially lessens the possibility of entrance of dust and moisture into the explosion chamber to cause deterioration of the conductor or other internal parts.

The upper ends of levers 31 are rounded over to form mounting lugs 40 for engagement with seats or grooves 20 in contact bars 15 and 16. The circuit interrupting unit may be quickly and readily mounted by insertion of the top of the unit between bars 15 and 16, the outwardly flared portions 21 of the bars serving to guide lugs 40 into seats 20 as the unit is pressed upwardly. When the unit is in operative position, the pressure of bars 15 and 16 against lugs 40, due to springs 17, tends to cause the lower ends of the levers to swing outwardly, but such swinging normally is prevented by the tensioned conductor which is connected between the levers and which normally completes the electric circuit between line conductors 11 and 12. Upon occurrence of an overload or short circuit, the fusible section, comprising wires 33 and 34, ruptures with resultant release of levers 31. The lower free ends of the levers thereupon swing outwardly in opposite directions from the body of the carrier until they are stopped in their positions shown in Fig. 3 by engagement with guide portions 21 of the contact bars. Thus, the levers give a clearly observable indication of circuit interruption while the circuit interrupting unit is prevented from dropping to the ground. As is well known, separation of the ends of the ruptured fuse link, due to outward swinging of the levers, aids in extinguishment of the arc and interruption of the current flow, the interrupting process being aided also by expulsion of gases from chamber 25 outwardly through restricted openings or ports 26. The circuit interrupting unit, after the interrupting operation, may be readily removed for refusing.

In the modification of Fig. 4, the lower face of strain insulator 10 is provided with spaced apart resilient contact clips 43 having terminal clamps 44 to which the bared free ends of line conductors 11 and 12 respectively are connected. The insulating carrier of the removable circuit interrupting unit is constructed in a manner similar to that of the unit of Fig. 1, in that it comprises an annular spacer 45 having end plates 46 suitably secured to opposite sides thereof so as to provide an explosion chamber 47. Each of the end plates 46 has a recess in the outer face thereof for receiving a cup-shaped metallic shield 50 and a centrally located exhaust port 51 communicating with chamber 47. Supporting elements or hinge brackets 52 are secured respectively to the outer faces of end plates 46 adjacent the top of the carrier and are provided with openings for receiving the trunnions 53 of lever-like terminal elements 54. Shields 50, which are attached respectively to levers 54 by riveting, as indicated at 49, or other suitable means, have restricted openings in registry with exhaust ports 51 and serve to impede the entrance of dust and moisture into chamber 47. The lower free ends of levers 54 have attachment sections 55 to which are secured respectively, by means of screws 36, the terminal end portions 32 of a conductor having a middle fusible section comprised of a fuse wire 33 and a strain wire 34.

As in the embodiment previously described, the conductor normally restrains the lower free ends of the lever elements in close parallel relation with the outer faces of end plate 46 of the insulating carrier.

The upper portions of levers 54, above their pivot points, are bent sharply outwardly, as indicated at 56, and rounded over at their extreme ends to form mounting lugs 57 which are engageable with seat portions 60 of contact clips 43 for supporting the circuit interrupting unit. The lower free ends of the contact clips are curved outwardly, as indicated at 61, so as to facilitate movement of lugs 57 into seats 60.

As will be evident from Fig. 4 and the foregoing description, each of the hinged elements 54 is in the form of a bell-crank lever, one arm of which comprises the portion extending downwardly from the pivot point 53 and including attachment section 55, while the other arm comprises the portion above the pivot point 53 and including outwardly bent section 56. Thus, the forces on the levers due to the described mounting arrangement, and including the weight of the insulating carrier, impose on the levers a rotational bias which is in opposition to the restraining force of the tensioned conductor and which tends to effect swinging of the lower ends of the levers outwardly from the body of the carrier. The inward pressure exerted by resilient contact clips 43 on the upper ends of the levers, resulting from the outward flexure of the contact clips when the circuit interrupting unit is inserted therebetween, of course contributes to producing the aforesaid rotational bias.

Upon rupture of the fusible section comprising fuse wire 33 and strain wire 34, levers 54 are released and the insulating carrier tends to drop downwardly. The levers thereupon swing outwardly to positions similar to those previously described in connection with the embodiment of Fig. 1 and shown in Fig. 3. At the same time, the free ends of contact clips 43 flex inwardly relatively toward each other and the guide portions 61 of the contact clips engage the levers, in a manner similar to that described in connection with Fig. 3, so as to stop the levers in an indicating position while preventing the circuit interrupting unit from dropping to the ground. If it is desired to have the unit drop completely away from its support, guide portions 61 of contact clips 43 may be bent outwardly so as to allow sufficient rotation of the levers to cause disengagement of lugs 57 from seats 60.

In the third embodiment, shown in Fig. 5, strain insulator 10 has fastened to the underneath side thereof, and in spaced relationship, two contacts 65 and 66, each of which is provided with suitable clamping means, indicated at 67, for connecting line conductors 11 and 12 thereto. From the detail views of Figs. 6 and 7 it will be seen that the downwardly depending portion of contact 65 has side plates 68 which are bent along the broken lines of Fig. 6 into the parallel relationship shown in Fig. 7, to form a hinge bracket, the side plates 68 having slots 69 to serve as bearing seats. The downwardly depending portion of the other contact, 66, has a latching seat 70 and a curved guide portion 71.

The circuit interrupting unit of the embodiment of Fig. 5 includes an elongated insulating fuse tube 72 having two straps 73 clamped respectively around the opposite ends thereof by means of bolts 74. A metallic bell-crank lever 75 is pivoted on a pin 76 which extends between the spaced apart upwardly projecting ends of the left-hand strap 73, while a second bell-crank lever 77 is pivoted on a pin 78 extending between the upwardly projecting spaced apart ends of the right-hand strap 73. The free end of one of the arms of lever 75 has trunnion pins 78 engageable with bearing seats 69 of contact 65 to support the left-hand end of the fuse tube. The other arm of lever 75 has a hollow terminal portion 79 the end of which is closed by a screw cap 80. One arm of lever 77 has a similar hollow terminal portion 81 with a thumb-screw 82. The other arm of lever 77 is formed with a nose portion 83 for engagement with the latching seat 70 of contact 66, and also has an eye 84 for engagement by a switch stick or other means to manipulate the circuit interrupting unit into and out of operative position. Within tube 72 is disposed a common form of fuse link having a button-head cap 85, a terminal shank 86, a fuse wire 87, a strain wire 88, and a flexible cable extension 89. The button-head cap of the fuse link is clamped by screw cap 80 of the left-hand terminal 79, while the end of cable extension 89 is clamped by thumb-screw 82 of the right-hand terminal 81. Thus, the fuse link normally holds levers 75 and 77 fixed relative to tube 72 so that the circuit interrupting unit forms a rigid switch blade. Under these circumstances, and with trunnions 78 engaged in bearing seats 69, the switch blade may be swung, by means of handle 84, into the operative position illustrated in Fig. 5, wherein the switch blade is latched by engagement of nose 83 with seat 70. With the switch blade supported in operative position, there is imposed upon levers 75 and 77 a rotational bias which is in opposition to the restraining force of the tensioned fuse link and which is due principally to the weight of the fuse carrier. Contacts 65 and 66 preferably are somewhat resilient, and in such case, as will be evident to one skilled in the art, the geometry of the supporting arrangement may be made such that the pressure of the contacts also will contribute to the rotational bias on the lever elements, as in the arrangement of the two embodiments previously described.

Upon rupture of the fuse link in the embodiment of Fig. 5, levers 75 and 77 are released for swinging relative to tube 72 and the switch blade collapses. Lever 77 becomes disengaged from contact 66 so as to permit the fuse tube to swing downwardly about trunnions 78 to a dropped-out position. However, prior to complete disengagement of lever 77 from contact 66, the swinging of the levers relative to the fuse tube effects rapid separation of the ends of the ruptured fuse link so as to aid in the extinction of the arc.

After operation and drop out of the circuit interrupting unit, the unit may be readily removed from its supporting insulator 10, by disengagement of trunnions 78 from bearing seat 69, to permit refusing. With a new fuse link in the fuse tube, trunnions 78 may again be engaged with bearing seat 69, and the fuse unit, then a rigid switch blade, may be swung into operative position in the manner previously described.

The present invention, in certain of its broader aspects, is not limited strictly to the details of the exemplary constructions described and illustrated herein, but may be carried out in other ways, as, for example, by means of the constructions disclosed in my application Serial No. 285,- 340, filed concurrently with the present application and assigned to the same assignee as the present invention. Hence, it is intended that such other modifications as do not depart from the true spirit of the present invention shall come within the scope of the appended claims.

What I claim as new and desire to secure by Letters Patent of the United States is:

1. In a circuit interrupter, current carrying means operable to interrupt an electric circuit, an insulating carrier therefor having two levers pivoted so as to be swingable relative to each other and the body of the carrier, means operative normally to restrain the levers against swinging and arranged to release the levers responsively to circuit interrupting operation of said first means, and supporting means for the carrier comprising two supporting elements co-operating respectively with said levers in a manner to support the carrier normally in an operative position and to cause swinging of the levers relative to the carrier upon release of the levers by said restraining means.

2. In a circuit interrupter, an insulating carrier having spaced terminals comprising two levers pivoted for swinging relative to each other and the body of the carrier, circuit interrupting means including a tensioned conductor connected between said levers and releasably restraining the levers against swinging, and supporting means for said carrier comprising a pair of conductive supporting elements cooperating respectively with said levers in a manner to support the carrier and to produce a bias tending to effect swinging of the levers in opposite directions relative to each other and the body of the carrier, said levers being released in response to operation of said circuit interrupting means.

3. In a circuit interrupter, an insulating carrier having spaced terminal means including two levers pivoted to swing relative to each other and the body of the carrier, current carrying means operable to interrupt an electric circuit and including a conductor tensioned between said levers and releasably restraining the levers against swinging, parts of said levers normally occupying positions relatively close to the body of said carrier, and a pair of conductive supporting elements cooperating respectively with said levers in a manner to support the carrier and to produce a bias tending to effect swinging of the levers in opposite directions relative to the carrier, said parts of said levers being swingable outwardly from the body of the carrier to indicating positions upon release of the levers by said conductor.

4. In a circuit interrupter, an insulating carrier having two bell crank levers pivoted to swing relative to each other and the body of the carrier, one arm of each of said levers normally extending transversely of and relatively close to a respective one of the opposite ends of said carrier and having terminal means thereon, current carrying means operable to interrupt an electric circuit and including a conductor connected between said terminal means and releasably restraining said levers against swinging, and two supporting elements cooperating respectively with the other arms of the bell crank levers in a manner to support said carrier and to cause swinging of the levers relative to the body of the carrier upon release of the levers.

5. In a circuit interrupter, an insulating carrier having two bell crank levers pivoted to swing relative to each other and the body of the carrier, one arm of each of said levers having conductor engaging means, current carrying means operable to interrupt an electric circuit and including a tensioned conductor connected between said engaging means so as releasably to restrain the levers against swinging, and two supporting elements respectively cooperating with the other arms of the bell crank levers to support said carrier so that the weight of the carrier exerts on said levers a rotational bias in opposition to the restraining force of said tensioned conductor, whereby said levers swing in opposite directions relative to each other and the body of the carrier upon release of the levers by the conductor.

6. In a circuit interrupter, an insulating carrier having two levers pivoted to swing relative to each other and the body of the carrier, current carrying means operable to interrupt an electric circuit and including a tensioned conductor connected between said levers and releasably restraining the levers against swinging, whereby the body of the carrier and the levers normally form a relatively rigid unit, and two supporting elements respectively cooperating with said levers in a manner to support said carrier in a position such that the weight of the carrier produces a rotational bias on said levers in opposition to the restraining force of said conductor, whereby said levers swing in opposite directions relative to each other and the body of the carrier upon release of the levers by the conductor.

7. In an electric line suspension circuit interrupter, a strain insulator designed to be connected between and supported by two line conductors and having spaced line terminals, an insulating carrier separable from said insulator and having two levers pivoted to swing relative to each other and the body of the carrier, circuit interrupting means including a conductor tensioned between said levers to resist swinging of the levers and arranged to release the levers responsively to circuit interrupting operation, and two supporting elements mounted on said insulator and respectively engaging said levers to support said carrier in an operative position, said supporting elements cooperating with said levers in a manner to effect swinging of the levers relative to said carrier upon release of the levers.

8. In a circuit interrupter, an insulating support having spaced terminals, an insulating carrier having spaced terminal means for electric connection with said terminals, said carrier terminal means including two levers pivoted to swing relative to each other and the body of the carrier, current carrying means operable to interrupt an electric circuit and including a conductor tensioned between said levers and normally resisting swinging of the levers, said conductor being arranged to release the levers upon circuit interrupting operation, and means for supporting said carrier in operative position on said insulating support comprising two supporting elements mounted in spaced relation on the insulating support, one of said elements having means pivotally engaging one of said levers, the other of said elements engaging the other of the levers releasably to latch the carrier in operative position.

9. In a circuit interrupter, an insulating support, two contacts each having one end mounted on said support and each having a seat portion adjacent its free end and in opposed relation to the seat portion of the other contact, an insulating carrier having terminal means including two levers pivoted to swing relative to each other and the body of the carrier, and circuit interrupting means including a conductor tensioned between said levers to resist swinging thereof and arranged to release the levers responsively to circuit interrupting operation, each lever having means quick detachably engaging the seat portion of a respective one of said contacts to support said carrier generally between the contacts, said contacts being resiliently biased generally toward each other to impose a rotational force on said levers in opposition to the restraining force of said conductor, thereby to cause swinging of the levers relative to said carrier upon release of the levers by the conductor.

10. In a circuit interrupter, an insulating support, two spaced apart contacts thereon, each contact having a seat portion in opposed relation to the seat portion of the other contact, an insulating carrier having terminal means including two levers pivoted to swing relative to each other and the body of the carrier, circuit interrupting means including a conductor tensioned between said levers to resist swinging of the levers and arranged to release the levers upon circuit interrupting operation, each of said levers having means quick detachably engaging the seat portion of a respective one of said contacts removably to support said carrier generally between the contacts, at least one of said contacts being resiliently biased generally toward the other to impose a rotational force on the levers in opposition to the tension of said conductor, and means to prevent said carrier from dropping out from between said contacts upon swinging of the levers due to release thereof by the conductor.

11. In a circuit interrupter, an insulating support having two contact plates movably mounted thereon in substantially parallel spaced relationship, each of which plates has a seat portion in opposed relation to the seat portion of the other plate, springs biasing said plates relatively toward each other, an insulating carrier having terminal means including two levers pivoted to swing relative to each other and the body of the carrier, and circuit interrupting means including a conductor tensioned between said levers to resist swinging thereof and arranged to release the levers responsively to circuit interrupting operation, each of said levers having means quick detachably engaging the seat portion of a respective one of said contact plates to support said carrier generally between the contact plates, which said plates are operative to impose on said levers a rotational force in opposition to the restraining force of said conductor.

12. In a circuit interrupter, an insulating housing defining an arcing chamber having gas discharge openings respectively at the opposite ends thereof, current carrying means operable to interrupt an electric circuit in said chamber, two levers pivoted on the housing to swing relative to each other and the housing, means operative normally to restrain said levers against swinging and arranged to release the levers responsively to circuit interrupting operation of said first means, each of said levers having a part normally operative substantially to close a respective one of said openings, and two supporting elements respectively cooperative with said levers to support said housing.

SIDNEY R. SMITH, Jr.